(12) United States Patent
Chatterjee et al.

(10) Patent No.: US 11,144,726 B2
(45) Date of Patent: Oct. 12, 2021

(54) METHOD AND SYSTEM FOR IDENTIFYING USER INTENT FROM USER STATEMENTS

(71) Applicant: Wipro Limited, Bangalore (IN)

(72) Inventors: Arindam Chatterjee, Gondalpara (IN); Rahul Arya, Gwalior (IN)

(73) Assignee: Wipro Limited, Bangalore (IN)

( * ) Notice: Subject to any disclaimer, the term of this patent is extended or adjusted under 35 U.S.C. 154(b) by 215 days.

(21) Appl. No.: 16/368,899

(22) Filed: Mar. 29, 2019

(65) Prior Publication Data

US 2020/0265116 A1  Aug. 20, 2020

(30) Foreign Application Priority Data

Feb. 14, 2019  (IN) .............................. 201941005832

(51) Int. Cl.
*G06F 40/30* (2020.01)
*G06N 3/02* (2006.01)
(Continued)

(52) U.S. Cl.
CPC .............. *G06F 40/30* (2020.01); *G06F 17/16* (2013.01); *G06F 40/49* (2020.01); *G06K 9/628* (2013.01); *G06N 3/02* (2013.01)

(58) Field of Classification Search
CPC . G10L 15/22; G10L 15/1815; G10L 15/1822; G10L 15/16; G10L 15/02;
(Continued)

(56) References Cited

U.S. PATENT DOCUMENTS

2014/0288920 A1  9/2014  Proux
2017/0185590 A1*  6/2017  Tetreault ............... G06F 40/151
(Continued)

OTHER PUBLICATIONS

Luong et al., "Intent extraction from social media texts using sequential segmentation and deep learning models," 2017 9th International Conference on Knowledge and Systems Engineering (KSE), Hue, 2017, pp. 215-220, doi: 10.1109/KSE.2017.8119461 (Year: 2017).*

(Continued)

*Primary Examiner* — Michelle M Koeth
(74) *Attorney, Agent, or Firm* — Finnegan, Henderson, Farabow, Garrett & Dunner, LLP

(57) ABSTRACT

The present disclosure discloses method and a user intent identification system for identifying user intent from user statements. The user intent identification system receives input statement provided by a user from a Natural Language Understanding (NLU) engine. The input statement is processed to remove one or more irrelevant content. A plurality of features for each word in the processed input statement is extracted. The plurality of features comprises Parts of Speech (POS) label, dependency parse tree and word embeddings. The user intent determination system predicts class for each word in the processed input statement from a plurality of predefined classes using a neural network model. The neural network model predicts class for each word based on input vector generated for the each word based on the plurality of features. Thereafter, the user intent is identified based on class predicted for each word in processed input statement.

17 Claims, 6 Drawing Sheets

(51) Int. Cl.
  *G06F 17/16* (2006.01)
  *G06K 9/62* (2006.01)
  *G06F 40/49* (2020.01)
(58) Field of Classification Search
  CPC ......... G10L 15/18; G10L 15/00; G10L 15/19;
       G10L 15/197; G10L 2015/223; G06F
       16/3329; G06F 16/90332; G06F 16/353;
       G06F 16/367; G06F 16/24522; G06F
       16/285; G06F 16/344; G06F 16/2246;
       G06F 16/2457; G06F 16/322; G06F
       16/33; G06F 16/53; G06F 40/295; G06F
       40/284; G06F 40/20; G06F 40/117; G06F
       40/274; G06F 40/30; G06F 40/35; G06F
       40/49; G06F 17/16; G06N 20/00; G06N
       7/005; G06N 3/0454; G06N 3/02; G06K
       9/628
  See application file for complete search history.

(56) References Cited

U.S. PATENT DOCUMENTS

2017/0278514 A1* 9/2017 Mathias ............... G10L 15/22
2019/0340172 A1* 11/2019 McElvain ............. G06N 5/046

OTHER PUBLICATIONS

Li Y. et al. (2018) Question Answering for Technical Customer Support. In: Zhang M., Ng V., Zhao D., Li S., Zan H. (eds) Natural Language Processing and Chinese Computing. NLPCC 2018. Lecture Notes in Computer Science, vol. 11108. Springer, Cham. https://doi.org/10.1007/978-3-319-99495-6_1 (Year: 2018).*

Zhang, Z., et al., "Automatically Extracting Procedural Knowledge from Instructional Texts using Natural Language Processing", Research Explorer, 2012, 2 pages.

* cited by examiner

METHOD AND SYSTEM FOR IDENTIFYING USER INTENT FROM USER STATEMENTS

TECHNICAL FIELD

The present subject matter is related in general to automated information retrieval system, more particularly, but not exclusively to a method and system for identifying user intent from user statements.

BACKGROUND

Today using Natural Language Processing (NLP) and Natural Language Understanding (NLU) to interact with users/customers in all cognitive systems is a highly coveted requirement. User intent identification becomes a necessity for systems which use Artificial Intelligence (AI) to decipher user query content. Typically, the user intent is an information pertaining to what the user requires or wants. The user intent identification is a critical and essential component of a Human Machine Interface (HMI) system based on text-based interaction.

In the conventional approach, all natural language based intelligent systems rely heavily on identifying key information present in incoming user queries and the most vital information being the user intent. The user intent in most conventional intent mining systems attempts to capture the intent as a single or a contiguous sequence of text. This essentially means that not all components of the intent are necessarily captured. The user intent, if broken down to a more granular form, is a combination of an action or a verb and a centre of interest pertaining to which the action needs to be performed. The action is an entity, which, in most HMI systems is not mined. The action typically determines what the user intends to do. Thus, inaccurate extraction of the action may lead to a different mined intent than what the user originally desired and ends up in rendering unwanted results to users. In addition, the user may provide certain added information which helps in deciphering true intent expressed by the user. The conventional system may not capture these added information which may lead to an incomplete understanding of the intent.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for identifying user intent from user statements. The method includes receiving an input statement provided by a user from a Natural Language Understanding (NLU) engine. The input statement is processed to remove one or more irrelevant content. The method includes extracting plurality of features for each word in the processed input statement. The plurality of features comprises Parts of Speech (POS) label, dependency parse tree and word embeddings. Further, the method includes predicting a class for the each word in the processed input statement from a plurality of predefined classes using a neural network model. The neural network model predicts the class for the each word based on an input vector generated for the each word based on the plurality of features. Thereafter, the method includes identifying the user intent based on the class predicted for the each word in the processed input statement.

In an embodiment, the present disclosure may relate to a user intent identification system for identifying user intent from user statements. The user intent identification system may include a processor and a memory communicatively coupled to the processor, where the memory stores processor executable instructions, which, on execution, may cause the user intent identification system to receive an input statement provided by a user from a Natural Language Understanding (NLU) engine. The input statement is processed to remove one or more irrelevant content. The user intent identification system extracts a plurality of features for each word in the processed input statement. The plurality of features comprises Parts of Speech (POS) label, dependency parse tree and word embeddings. Further, the user intent determination system predicts a class for the each word in the processed input statement from a plurality of predefined classes using a neural network model. The neural network model predicts the class for the each word based on an input vector generated for the each word based on the plurality of features. Thereafter, based on the class predicted for the each word in the processed input statement, the user intent determination system identifies the user intent.

In an embodiment, the present disclosure relates to a non-transitory computer readable medium including instructions stored thereon that when processed by at least one processor may cause a user intent identification system to receive an input statement provided by a user from a Natural Language Understanding (NLU) engine. The input statement is processed to remove one or more irrelevant content. The instruction causes the processor to extract a plurality of features for each word in the processed input statement. The plurality of features comprises Parts of Speech (POS) label, dependency parse tree and word embeddings. Further, the instruction causes the processor to predict a class for the each word in the processed input statement from a plurality of predefined classes using a neural network model. The neural network model predicts the class for the each word based on an input vector generated for the each word based on the plurality of features. Thereafter, the instruction causes the processor to identify the user intent based on the class predicted for the each word in the processed input statement.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
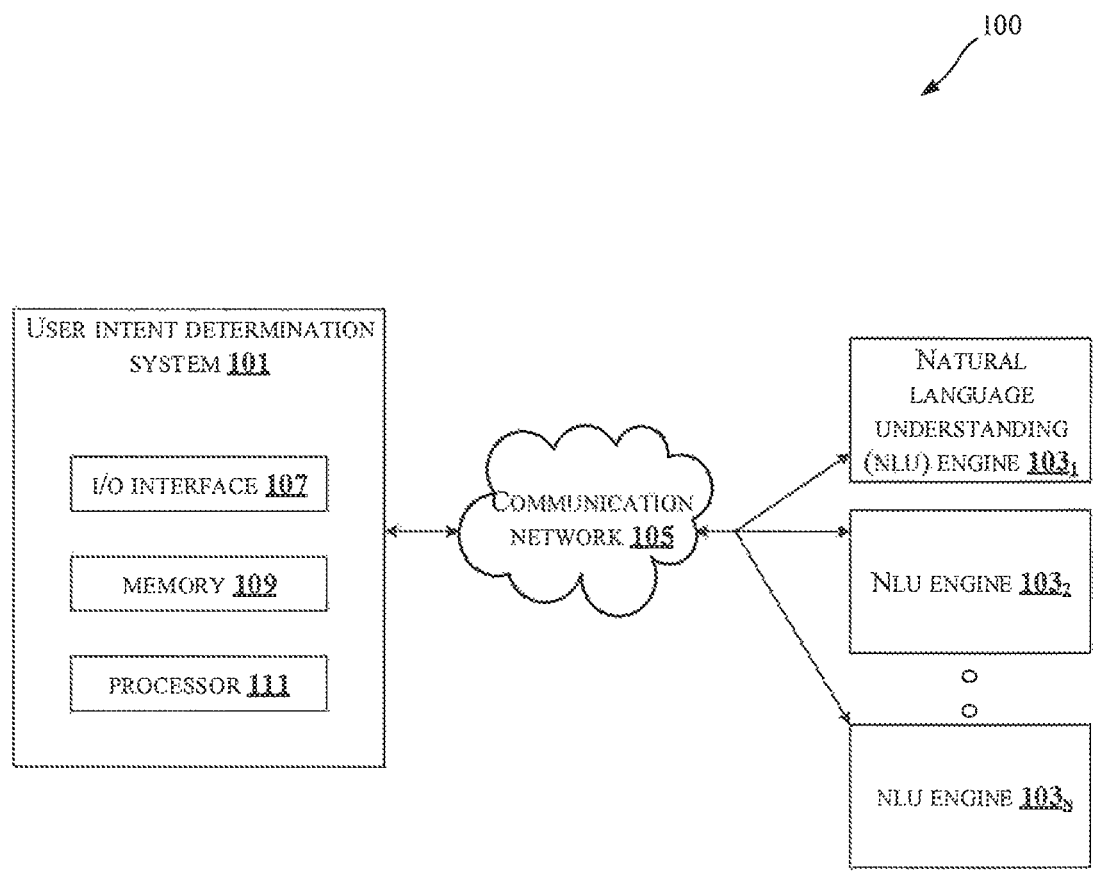
FIG. 1 illustrates an exemplary environment for identifying user intent from user statements in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and a user intent identification system for identifying user intent from user statements. In an embodiment, the user intent implies what a user is looking for when conducting a search query. Whenever a user statement is received for intent identification, the intent may be extracted as a word, phrase or a set of words, which may not completely and accurately indicate the intent of the user. In such scenario, the present disclosure takes user statement as input which may be in natural language format. The user statement or user utterance is processed to extract a plurality features such as, Parts of Speech (POS) label, dependency parse tree and word embeddings for each word in the user statement. The user statement along with the extracted features for each word is provided to a neural network to predict a class for each word based on predefined plurality of predefined classes. Thus, based on the class predicted for each word, the present disclosure identifies an intent of the user as a set of inter-dependent components, which are centre of interest, an action and additional features. The present disclosure identifies intent from natural language text utterances in interactive systems, which may be used by interaction based intelligent systems.

FIG. 1 illustrates an exemplary environment for identifying user intent from user statements in accordance with some embodiments of the present disclosure.

As shown in FIG. 1, an environment 100 includes a user intent identification system 101 connected through a communication network 105 to a Natural Language Understanding (NLU) engine $103_1$, an NLU engine $103_2$, . . . and an NLU engine $103_N$ (collectively referred as one or more NLU engine 103). In an embodiment, the one or more NLU engine 103 may refer to an engine which understands text in natural language to decipher content, intent and several other granular details from a text. The one or more NLU engine 103 may be for example, search engines, chat bots, question answering systems, conversation engines, intelligent personal assistants, data mining tools and the like. A person skilled in the art would understand that the scope of the present disclosure may encompass any other NLU engine 103, which understands natural language, not mentioned herein explicitly.

The user intent identification system 101 may identify an intent of a user. In an embodiment, the intent of the user may refer to what the user intends or wants while providing or typing an input statement into the one or more NLU engine 103. For example, the user may be fact-checking, shopping and the like. In an embodiment, the user intent identification system 101 may exchange data with other components and service providers (not shown explicitly in FIG. 1) using the communication network 105. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In one embodiment, the user intent identification system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the user intent identification system 101 in the present disclosure. Further, the user intent identification system 101 may include an I/O interface 107, a memory 109 and a processor 111. The I/O interface 107 may be configured to receive the input statement provided by the user from the one or more NLU engine 103. The input statement received from the I/O interface 107 may be stored in the memory 109. The memory 109 may be communicatively coupled to the processor 111 of the user intent identification system 101. The memory 109 may also store processor instructions which may cause the processor 111 to execute the instructions for identification of the user intent from the input statement.

The user intent identification system 101 may receive the input statement, whenever the user provides/types the input statement on an NLU engine of the one or more NLU engine 103. In an embodiment, the input statement may refer to utterances from users or user queries. The user intent identification system 101 may process the input statement by removing irrelevant content such as, noise and the like from the input statement. For instance, consider an input statement "The bottle on the table has a cap". The user intent identification system 101 may process the input statement and remove irrelevant content as noise such as "the" and "a" from the input statement. Further, the user intent identification system 101 may extract a plurality of features from the processed input statement. The plurality of features may be extracted for each word present in the processed input statement. In an embodiment, the plurality of features may include a Parts of Speech (POS) label, dependency parse tree and word embeddings. For instance, each word in the input statement is tagged with corresponding POS. In an embodiment, the dependency parse tree may be generated for the processed input statement based on intrinsic dependencies of each word with each of other words in the processed input statement. In an embodiment, the word embeddings are a representation of each of the one or more words in the processed input statement in a low-dimensional vector space.

The word embeddings are identified using an artificial word embedding neural network trained using a text corpus of a plurality of natural language sentences. In an embodiment, techniques for processing word embeddings, may include 'word2vec', 'GloVe', and 'eLMO'. A person skilled in the art would understand that the scope of the present disclosure may encompass any other technique for determining word embeddings, not mentioned herein explicitly. Based on the plurality of features for each word, the user intent identification system 101 may generate an input vector for each word in the processed user statement. In an embodiment, the input vector may include the POS label for a target word selected from a plurality of words present in the input statement, the POS label of a predetermined number of words prior to the target word, word embeddings of the target word, word embedding of head word in dependency parse tree and dependency label for the target word. Subsequently, the user intent identification system 101 may predict a class for the each word in the processed input statement from a plurality of predefined classes by providing the input vector for each word to a neural network model present in the user intent identification system 101. In an embodiment, the neural network model is trained using text corpus containing a plurality of natural language sentences tagged manually with the plurality of predefined classes. In an embodiment, the plurality of predefined classes includes a Begin-Central Idea (BCI), a Inside Central Idea (ICI), a Begin-Central Action (BCA), a Inside-Central Action (ICA), Begin-Central Idea Attributes (BCIA), and Inside-Central Idea Attributes (ICIA). The BCI may refer to a main requirement of the user in the processed input statement and the ICI may refer to a subordinate of the main requirement. The BCA may indicate main action intended by the user in the processed input statement and the ICA may indicate subordinate of main action. Further, the BCIA may refer to main attributes related to the main requirement and the main action and the ICIA may refer to subordinate attributes for the main attributes. Thereafter, the user intent identification system 101 may identify the intent of the user based on the class predicted for the each word in the input statement. In an embodiment, the user intent is represented as central idea, actions and features. Thereafter, the user intent identification system 101 may transmit the identified user intent to the NLU engine of the one or more NLU engine 103 which provides a response to the input statement based on the user intent.

Figure 2A:
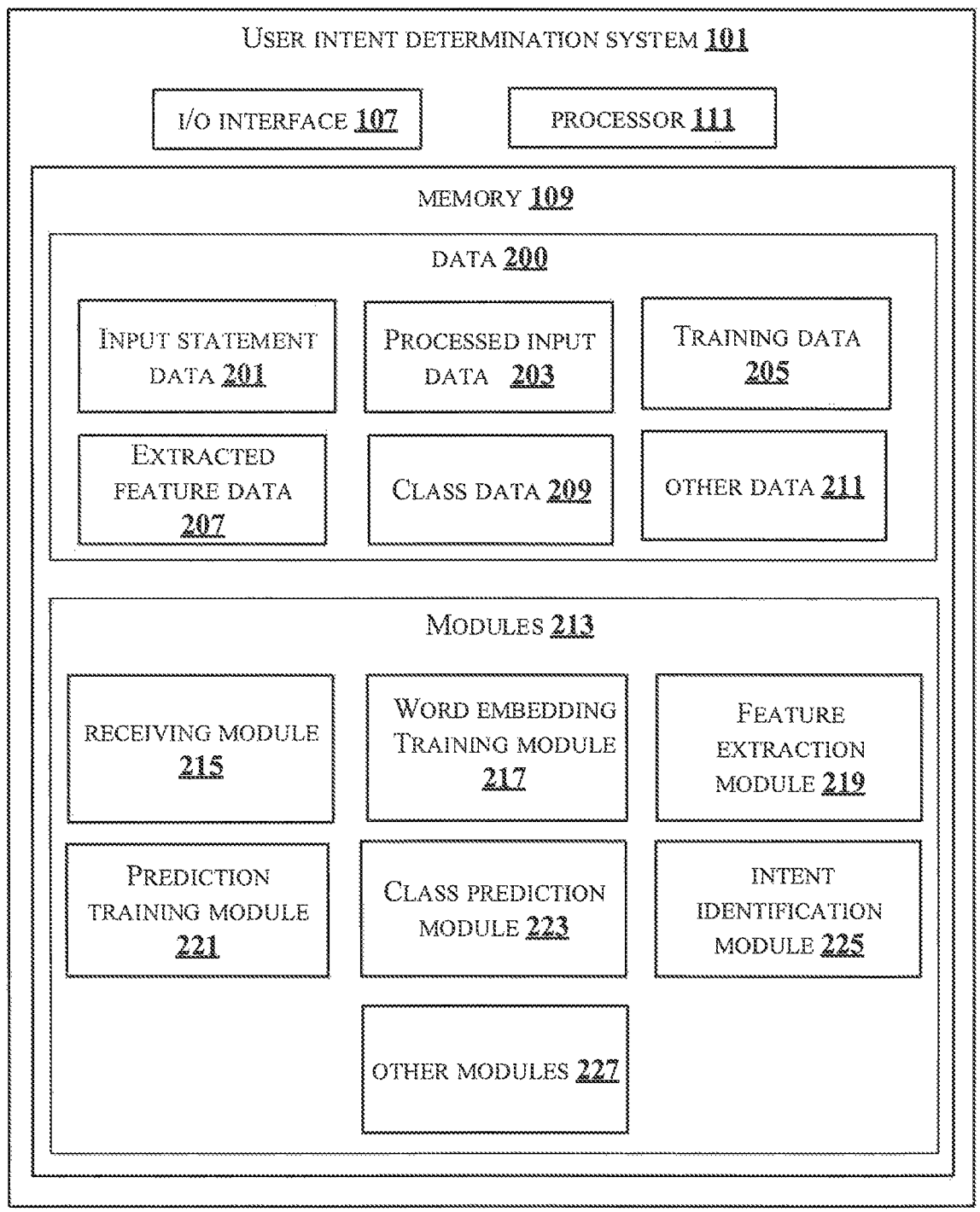
FIG. 2a shows a detailed block diagram of a user intent identification system in accordance with some embodiments of the present disclosure.

FIG. 2a shows a detailed block diagram of a user intent identification system in accordance with some embodiments of the present disclosure.

The user intent identification system 101 may include data 200 and one or more modules 213 which are described herein in detail. In an embodiment, data 200 may be stored within the memory 109. The data 200 may include, for example, input statement data 201, processed input data 203, training data 205, extracted feature data 207, class data 209 and other data 211.

The input statement data 201 may include the input statement provided by the user through the one or more NLU engine 103. The input statement may be in natural language. In an embodiment, the input statement may include a user utterance, user queries and the like. The input statement may refer to user utterances captured by user intent determination system 101 during a conversation of the user with a third party. In an example, the input statement provided by the user may be "How can I travel from JJ city to Bangalore Airport by bus, in the evening".

The processed input data 203 may include the processed input statement. In an embodiment, the processed input statement may include filtered and relevant content.

The training data 205 includes the text corpus of a plurality of natural language sentences. In an embodiment, the text corpus may be collected from varied sources such as, news, articles, blogs and the like. Further, the training data 205 contains the plurality of predefined classes, tagged manually for each word in the plurality of natural language sentences.

The extracted feature data 207 may include the plurality of features extracted for each word in the input statement. The plurality of features may include the Parts of Speech (POS) label, dependency parse tree and word embeddings.

The class data 209 may include information regarding the class predicted for each word in the input statement based on the plurality of predefined classes. The plurality of predefined classes may include Begin-Central Idea (BCI), Inside Central Idea (ICI), Begin-Central Action (BCA), Inside-Central Action (ICA), Begin-Central Idea Attributes (BCIA), Inside-Central Idea Attributes (ICIA) and others (O).

The other data 211 may store data, including temporary data and temporary files, generated by modules 213 for performing the various functions of the user intent identification system 101.

In an embodiment, the data 200 in the memory 109 are processed by the one or more modules 213 present within the memory 109 of the user intent identification system 101. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 213 may be communicatively coupled to the processor 111 for performing one or more functions of the user intent identification system 101. The said modules 213 when configured with the functionality defined in the present disclosure will result in a novel hardware.

In one implementation, the one or more modules 213 may include, but are not limited to a receiving module 215, a word embedding training module 217, a feature extraction module 219, a prediction training module 221, a class prediction module 223 and an intent identification module 225. The one or more modules 213 may also include other modules 227 to perform various miscellaneous functionalities of user intent identification system 101. In an embodiment, the other modules 227 may include a processing module, an input vector generation module and a post processing module. The processing module may process the input statement by removing unwanted token. The processing module may filter noise from the input statement. The input vector generation module may generate the input vector for each word in the processed input statement based on corresponding plurality of features. The input vector includes the POS label for the target word selected from the plurality of words present in the input statement, the POS label of predetermined number of words prior to the target word, the word embeddings of the target word, the word embedding of head word in dependency parse tree and dependency label for the target word.

The receiving module 215 may receive the input statement provided by the user from the NLU engine of the one or more NLU engine 103. Further, the receiving module 215 may provide the intent identified for the input statement to the NLU engine of the one or more NLU engine 103. The input statement may be for example, "Sachin Tendulkar used to play cricket for India".

The word embedding training module 217 may train the artificial word embedding neural network using the text corpus of the plurality of natural language sentences. Each word in the plurality of natural language sentences are tagged with a corresponding word embedding in order to train the artificial word embedding neural network. In an embodiment, the word embeddings represent each of one or more words in a low-dimensional vector space, for example, in three-hundred vector dimensions.

Figure 2B:
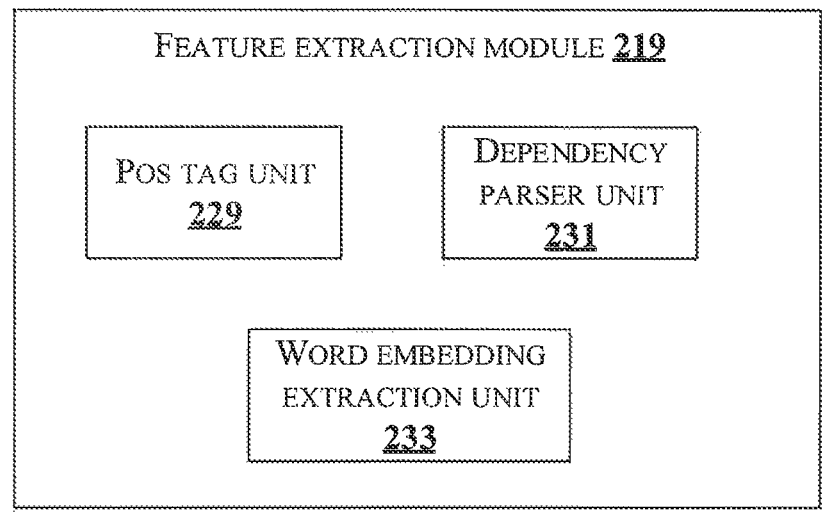
FIG. 2b shows a detailed block diagram of feature extraction module in accordance with some embodiments of the present disclosure.

The feature extraction module 219 may extract the plurality of features for each word in the processed input statement, processed by the processing module as explained above. The plurality of features extracted may include the Parts of Speech (POS) label, dependency parse tree and word embeddings. FIG. 2b shows a detailed block diagram of a feature extraction module in accordance with some embodiments of the present disclosure. As shown in FIG. 2b, the feature extraction module 219 include a POS tag unit 229, a dependency parser unit 231 and a word embedding extraction unit 233. The processed input statement is passed to the POS tag unit 229 which tags each word and punctuation in the processed input statement to associated part-of-speech. For instance, consider the processed input statement as "Sachin Tendulkar used to play cricket for India".

In such case, the POS tag unit 229 may tag each word in the input statement as "Sachin"—NNP, "Tendulkar"—NNP, "used"—VB, "to"/TO, "play"—VB, "cricket"—NN, "for"—IN and "India"—NNP. Here, VB refer to Verb, NNP refers to Noun (Proper), IN refers to Interjection and NN refers to Noun. Further, the dependency parser unit 231 may receive the processed input statement and generates a parse tree for the processed input statement based on the intrinsic dependencies of the each word in the processed input statement with each other. In an embodiment, the parse tree may analyse grammatical structure of the processed input statement and establishes relationships between head words and words which modify the heads words. For example, for the input statement "Sachin Tendulkar used to play cricket for India", the dependency parser unit 231 may generate the parse tree and dependencies as depicted below:

(ROOT
(S
  (NP (NNP Sachin) (NNP Tendulkar))
  (VP (VBD used)
    (S
      (VP (TO to)
        (VP (VB play)
          (NP (NN cricket))
          (PP (IN for)
          (NP (NNP India)))))))
Where, NP=noun phrase
VP=verb phrase
PP=preposition phrase
NNP=noun(proper), VBD=dependency verb, VB=verb, IN=interjection and NN=noun.

Further, the dependency parser unit 231 may generate universal dependencies as shown below:
compound (Tendulkar-2, Sachin-1)
nsubj(used-3, Tendulkar-2)s
root(ROOT-0, used-3)
mark(play-5, to-4)
xcomp(used-3, play-5)
dobj(play-5, cricket-6)
case(India-8, for-7)
nmod(play-5, India-8)

In the above universal dependencies, the relation/dependency compound (Tendulkar-2, Sachin-1) nsubj (used-3, Tendulkar-2) implies that 'Sachin Tendulkar' is compound subject of parsed input statement and the head word is root word "used".

Further, the word embedding extraction unit 233 may map each word in the processed input statement to a vector in a vector space with a pre-decided dimension. In an embodiment, the vector captures notion of syntactic and semantic features of each word in a context. In an embodiment, the word embedding extraction unit 233 may use techniques such as, 'word2vec', 'GloVe', and 'eLMO' and the like. A person skilled in the art would understand that any other technique for determining word embedding, not mentioned explicitly, may also be used in the present disclosure.

Returning to FIG. 2a, the prediction training module 221 may train the neural network model using the text corpus containing the plurality of natural language sentences tagged manually with the plurality of predefined classes. In an embodiment, the plurality of manually tagged classes are required by the neural network model in order to understand role of a word in a context. In an embodiment, the plurality of natural language sentences are tagged as one of, the 'B-CI' or Begin-Central Idea, the 'I-CI' or Inside-Central Idea, the 'B-CA' or Begin-Central Action, the 'I-CA' or Inside-Central Action, the 'B-CIA' or Begin-Central Idea Attributes, the 'I-CIA' or Inside-Central Idea Attributes and 'O' as others.

The class prediction module 223 may predict the class from the plurality of predefined classes for each word in the processed input statement. The class prediction module 223 may predict the class using the trained neural network model. The class prediction module 223 may predict the class for each word based on the input vector generated for each word by the input vector generation module. In an embodiment, the input vector includes the POS label for the target word selected from the plurality of words present in the input statement, the POS label of a predetermined number of words prior to the target word, word embeddings of the target word, word embedding of head word in dependency parse tree and the dependency parse tree for the target word. An exemplary input vector for the target word is shown in equation 1.

$$(x_{i-2}, x_{i-1}, x_i, W_i, W_h, D_l) \quad (1)$$

Where, Part-Of-Speech (POS) tags of the target word ($x_i$)
Part-Of-Speech (POS) tags of two words prior to the target word ($x_{i-2}, x_{i-1}$)
Word embeddings of the target word($W_i$)
Word embedding of Head word in Dependency Parse Tree ($W_h$)
Dependency Parse Tree Label of target word ($D_l$).

Figure 2C:
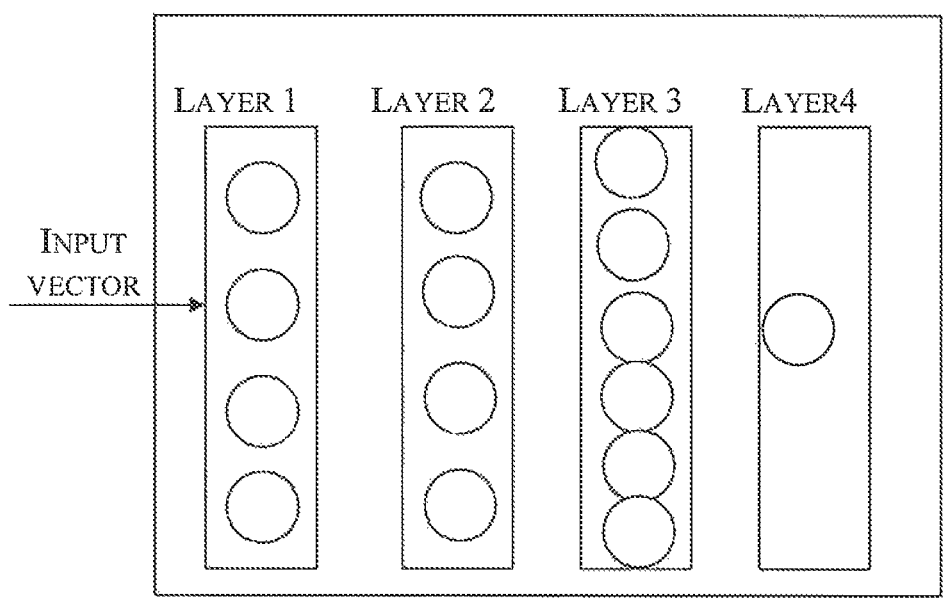
FIG. 2c shows an exemplary representation of neural network model in accordance with some embodiment of the present disclosure.

Further, the input vector for each word in the processed input statement is fed to the neural network model. FIG. 2c shows an exemplary representation of neural network model in accordance with some embodiment of the present disclosure. As shown in FIG. 2c, the neural network model includes, layer 1 as Bidirectional LSTM layer, Layer 2 as LSTM Layer, Layer 3 as dense Layer and Layer 4 as Softmax Layer. In an embodiment, the input vector for each word is fed into the bidirectional LSTM layer. In an embodiment, the bidirectional LSTM, is a particular type of Recurrent Neural Network (RNN). In an embodiment, the RNN is selected since the input statement is sequential, and RNNs are suited for sequential type of data and architecture is bidirectional. Thus, the neural network model may scan the input vector both backwards and forwards. Further, output from the bidirectional LSTM is forwarded into the second LSTM layer. In an embodiment, hidden states of the Bi LSTM layer are fed into the second LSTM layer for a better understanding of semantic content of the input vector. The feed-forward equations of the LSTM may be represented as below.

$$i = \sigma(x_t U^i + s_{t-1} W^i) \quad (2)$$

$$f = \sigma(x_t U^f + s_{t-1} W^f) \quad (3)$$

$$o = \sigma(x_t U^o + s_{t-1} W^o) \quad (4)$$

$$g = \tan h(x_t U^g + s_{t-1} W^g) \quad (5)$$

$$c_t = (c_{t-1} * f + g * i) \quad (6)$$

$$s_{t-1} = \tan h(c_t) * o \quad (7)$$

Where, i, f and o=called input, forget and output gates respectively. All the gates have the same dimensions.
$d_s$ is the size of the hidden state.
U and W=weight matrices.
g is =candidate" hidden state that is computed based on the current input and the previous hidden state.
$c_t$=is the internal memory of the unit.
In an embodiment, $c_t$ is a combination of the previous memory $c_{t-1}$ multiplied by the forget gate, and the newly computed hidden state g multiplied by the input gate. $s_t$=is the current hidden state and $s_{t-1}$ is the previous hidden state.
'*' is elementwise multiplication.

Further, features captured by the LSTM layers may be accumulated and combined by the dense layer into concrete features. The dense layer is a simple neural network where all the nodes of the network are connected to the previous layer. Thereafter, final output of the neural network is calculated using the Softmax function, which is a generalized form of the logistic function. The Softmax function essentially computes a distribution among resultant classes. For example, consider the input statement as: "Sachin Tendulkar used to play cricket for India". The class prediction module 223 may predict the class for each word as, Sachin_B-CI Tendulkar_I-CI used_O to_O play_B-CA cricket_I-CA for_B-CIA India_I-CIA.

The intent identification module 225 may identify the intent of the user based on the class predicted for each word in the processed input statement. The intent identification module 225 may receive the prediction for each word from the class prediction module 223. The intent identification module 225 may extract the intent from the predicted class for each word. For example, for the input statement "Sachin Tendulkar used to play cricket for India", the class predicted for each word is, Sachin_B-CI Tendulkar_I-CI used_O to_O play_B-CA cricket_I-CA for_B-CIA India_I-CIA". Thus, the intent is identified as "<Sachin Tendulkar; play cricket; for India>". In an embodiment, the identified intent is provided to the NLU engine of the one or more NLU engine 103.

Figure 3:
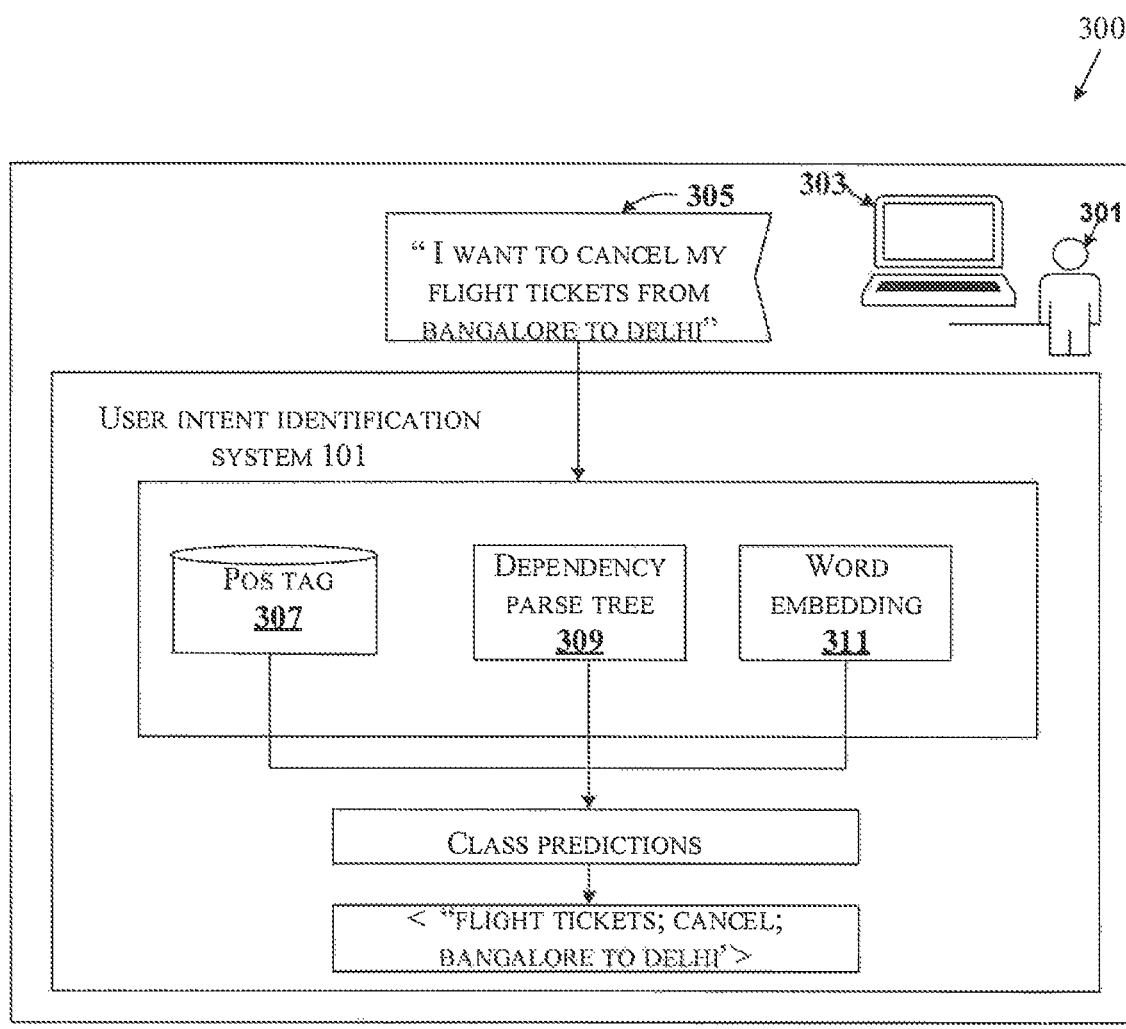
FIG. 3 illustrates an exemplary representation of identifying user intent from user statements in accordance with some embodiments of present disclosure.

FIG. 3 illustrates an exemplary representation of identifying user intent from user statements in accordance with some embodiments of present disclosure.

Referring now to FIG. 3, an exemplary representation 300 for identifying user intent from user statements is illustrated. In the FIG. 3, the exemplary representation 300 includes a user 301 querying through a conversation engine 303. The conversation engine 303 is connected through a communication network to the user intent identification system 101 (not shown explicitly in FIG. 3). Consider the user 301 queries the conversation engine 303 by typing a query represented as user query 305. As shown in FIG. 3, the user 301 types the user query 305 as "I want to cancel my flight ticket from Bangalore to Delhi". The user intent identification system 101 may process the user query 305 and extract the plurality of features for each word in the user query 305 as POS tag 307, a dependency parse tree 309 and word embeddings 311. Further, for each word, the user intent identification system 101 may generate the input vector for predicting the class for each word in the user query 305. For instance, consider the input vector for the user query 305 as "<I1, I2, I3, I4, I5, I6, I7, I8, I9, I10, I11>".

In such case, each of the input vector "I1, I2, I3, I4, I5, I6, I7, I8, I9, I10 and I11 may include the POS label for the target word, the POS label of predetermined number of words prior to the target word, for instance, the POS label of two words prior to the target word, the embeddings of the target word, word embedding of head word in dependency parse tree and the dependency label for the target word. For instance, when the target word is "ticket", the input vector is represented by "I7". The input vector "I7" includes {[NN], [NN], [PN], <w1, . . . , w300>, <W1, . . . , W300>, <DOBJ>}. In the input vector I7, the "[noun (NN)], [noun (NN)], [pronoun (PN)]" represents the POS label of the target word, "ticket" and the POS label of two words "flight" and "my" prior to the target word "ticket". Further, "<w1, . . . , w300>, <W1, . . . , W300>" represents the word embedding representations of the target word "ticket" and of the head word "my". The "<DOBJ>" represents the dependency label of the target word "ticket". Likewise, the user intent identification system 101 may generate the input vector for each word in the user query 305. Subsequently, the user intent identification system 101 provides the input vector "<I1, I2, I3, I4, I5, I6, I7, I8, I9, I10, I11>" generated for each word in the user query 305 to the neural network model. The neural network model of the user intent identification system 101 may predict the class for each word in the user query 305 based on the corresponding input vector. Thereafter, based on the predicted class, the user intent identification system 101 may identify the intent of the user 301 in the user query 305. In the present case, the intent for the user query 305 is identified as <"flight ticket; cancel; Bangalore to Delhi">.

Figure 4:
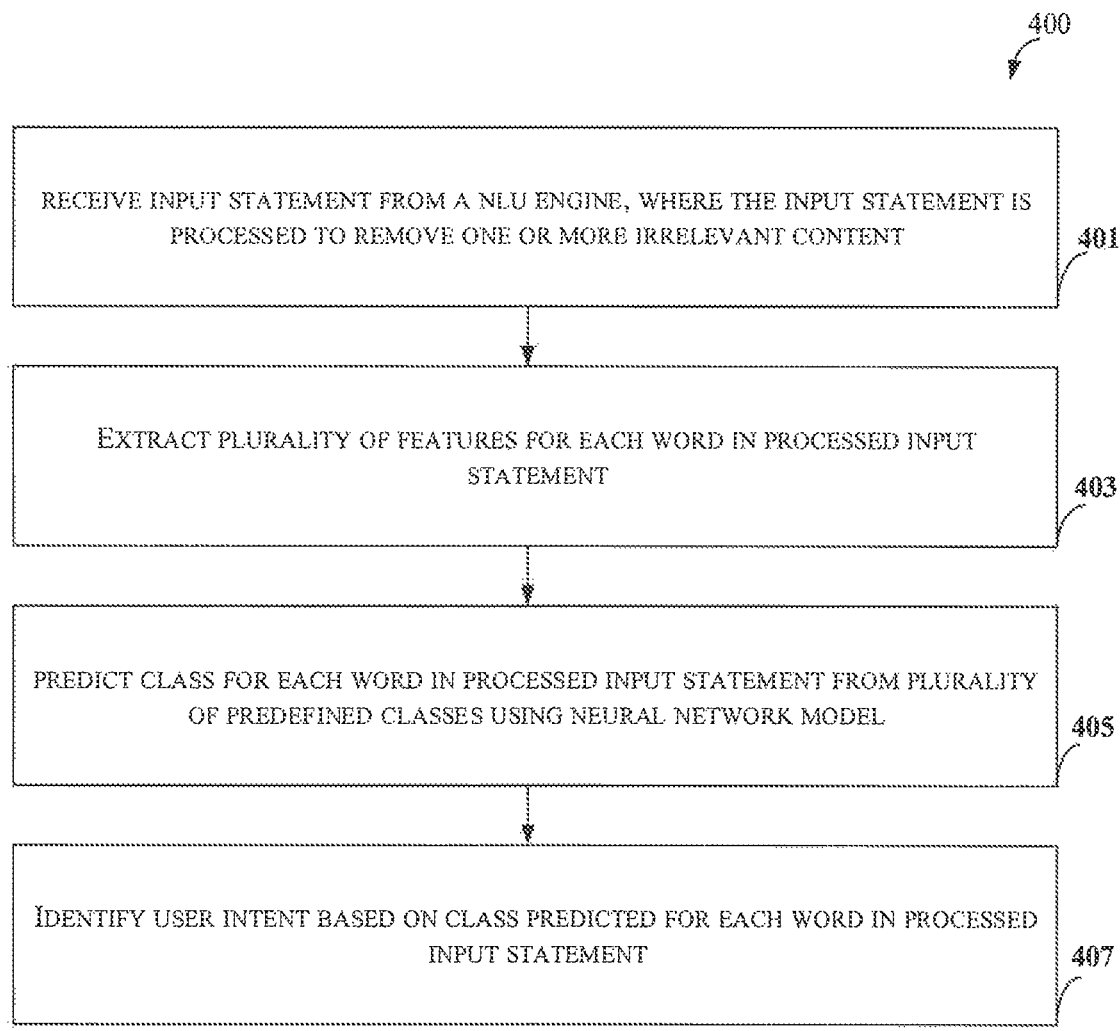
FIG. 4 illustrates a flowchart showing a method for identifying user intent from user statements in accordance with some embodiments of present disclosure.

FIG. 4 illustrates a flowchart showing a method for identifying user intent from user statements in accordance with some embodiments of present disclosure.

As illustrated in FIG. 4, the method 400 includes one or more blocks for identifying user intent from user statements. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the input statement provided by the user is received by the receiving module 215 from the Natural Language Understanding (NLU) engine. In an embodiment, the input statement is processed to remove one or more irrelevant content.

At block 403, the plurality of features for each word in the processed input statement is extracted by the feature extraction module 219. In an embodiment, the plurality of features comprises the Parts of Speech (POS) label, the dependency labels and the word embeddings.

At block 405, the class for the each word in the processed input statement is predicted by the class prediction module 223 from the plurality of predefined classes using the neural network model. In an embodiment, the neural network model predicts the class for the each word based on the input vector generated for the each word based on the plurality of features.

At block 407, the user intent is identified by the intent identification module 225 based on the class predicted for the each word in the processed input statement. In an embodiment, the user intent is provided to the NLU engine of the one or more NLU engine 103 to provide the response to the input statement based on the user intent.

Figure 5:
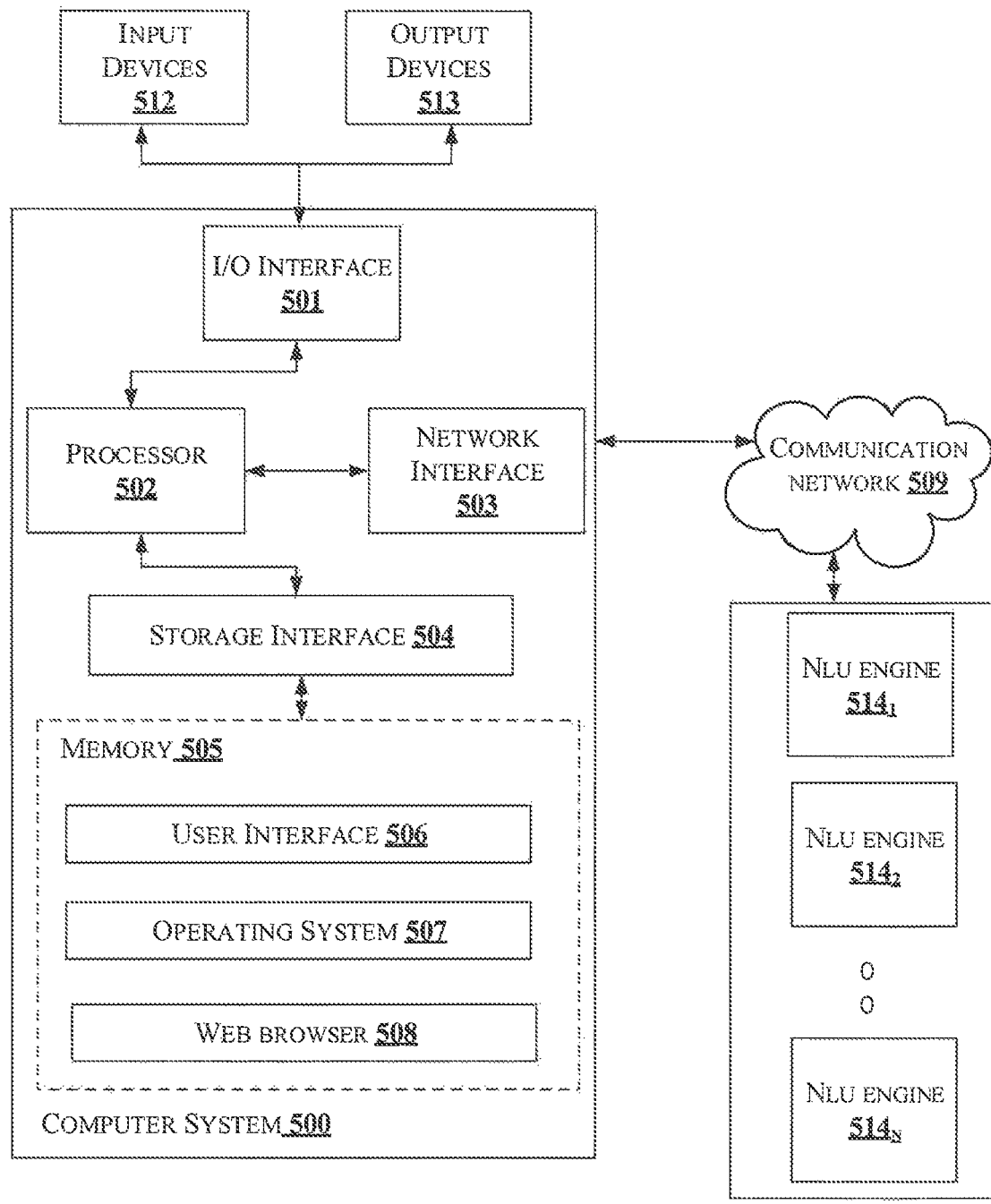
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the user intent identification system 101. The computer system 500 may include a central processing unit ("CPU" or "processor") 502. The processor 502 may include at least one data processor for identifying user intent from user statements. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the user intent identification system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11 a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a Natural Language Engine (NLU) $514_1$, an NLU $514_2$, ... and an NLU $514_N$ (collectively referred as one or more NLU 514). The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure identifies complete intent from natural language text utterances in interactive systems, which is highly usable by interaction based intelligent systems.

An embodiment of the present disclosure automatically learns words and their semantic interpretations across a huge set of words.

In an embodiment of the present disclosure intent in a user query is captured in terms of well-defined components, which are related to each other. Each component can be used as a standalone feature in many systems.

An embodiment of the present disclosure ensures to capture overall intent of an input text. The present disclosure identifies the intent with a structure of a three-tuple components. The three tuple components are inter-dependent and are well defined and reflects what each component indicates.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | User intent identification system |

REFERRAL NUMERALS

| Reference number | Description |
| --- | --- |
| 103 | One or more NLU engine |
| 105 | Communication network |
| 107 | I/O interface |
| 109 | Memory |
| 111 | Processor |
| 200 | Data |
| 201 | Input statement data |
| 203 | Processed input data |
| 205 | Training data |
| 207 | Extracted feature data |
| 209 | Class data |
| 211 | Other data |
| 213 | Modules |
| 215 | Receiving module |
| 217 | Word embedding training module |
| 219 | Feature extraction module |
| 221 | Prediction training module |
| 223 | Class prediction module |
| 225 | Intent identification module |
| 227 | Other modules |
| 229 | POS tag unit |
| 231 | Dependency parse unit |
| 233 | Word embedding extraction unit |
| 301 | User |
| 303 | Conversation engine |
| 305 | User query |
| 307 | POS tag |
| 309 | Dependency parse tree |
| 311 | Word embedding |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | One or more NLU engines |

What is claimed is:

1. A method for identifying user intent from user statements, the method comprising:

receiving, by a user intent determination system, an input statement provided by a user from a Natural Language Understanding (NLU) engine, wherein the input statement is processed to remove one or more irrelevant content;

extracting, by the user intent determination system, a plurality of features for each word in the processed input statement, wherein the plurality of features comprises a Parts of Speech (POS) label, a dependency parse tree, and word embeddings;

predicting, by the user intent determination system, a class for the each word in the processed input statement from a plurality of predefined classes using a neural network model, wherein the neural network model predicts the class for the each word based on an input vector generated for the each word based on the plurality of features, wherein the input vector comprises the POS label for a target word selected from a plurality of words present in the input statement, the POS label of a predetermined number of words prior to the target word, word embeddings of the target word, a word embedding of a head word in the dependency parse tree and a dependency label for the target word; and identifying, by the user intent determination system, the user intent based on the class predicted for the each word in the processed input statement, wherein the user intent is provided to the NLU engine to provide a response to the input statement based on the user intent.

2. The method as claimed in claim 1, wherein the dependency parse tree is generated based on intrinsic dependencies of the each word with each of other words in the processed input statement.

3. The method as claimed in claim 1, wherein the word embeddings are identified using an artificial word embedding neural network trained using a text corpus of a plurality of natural language sentences, the word embeddings being representation of each of one or more words in a first dimensional vector space.

4. The method as claimed in claim 1, wherein the neural network model is trained using a text corpus containing a plurality of natural language sentences tagged with the plurality of predefined classes.

5. The method as claimed in claim 1, wherein the plurality of predefined classes comprise a Begin-Central Idea (BCI), a Inside Central Idea (ICI), a Begin-Central Action (BCA), a Inside-Central Action (ICA), Begin-Central Idea Attributes (BCIA), and an Inside-Central Idea Attributes (ICIA).

6. The method as claimed in claim 1, wherein the user intent is represented as a central idea, actions and features.

7. A user intent determination system for identifying user intent from user statements, comprising:
a processor; and
a memory communicatively coupled to the processor, wherein the memory stores processor instructions, which, on execution, causes the processor to:
receive an input statement provided by a user from a Natural Language Understanding (NLU) engine, wherein the input statement is processed to remove one or more irrelevant content;
extract a plurality of features for each word in the processed input statement, wherein the plurality of features comprises a Parts of Speech (POS) label, a dependency parse tree and word embeddings;
predict a class for each word in the processed input statement from a plurality of predefined classes using a neural network model, wherein the neural network model predicts the class for each word based on an input vector generated for each word based on the plurality of features, wherein the input vector comprises the POS label for a target word selected from a plurality of words present in the input statement, the POS label of a predetermined number of words prior to the target word, word embeddings of the target word, a word embedding of a head word in the dependency parse tree and a dependency label for the target word; and
identify the user intent based on the class predicted for each word in the processed input statement, wherein the user intent is provided to the NLU engine to provide a response to the input statement based on the user intent.

8. The user intent determination system as claimed in claim 7, wherein the dependency parse tree is generated based on intrinsic dependencies of the each word with each of other words in the processed input statement.

9. The user intent determination system as claimed in claim 7, wherein the word embeddings are a representation of the word in a first dimensional vector space, the word embeddings are identified using an artificial word embedding neural network trained using a text corpus of a plurality of natural language sentences.

10. The user intent determination system as claimed in claim 7, wherein the processor trains the neural network model using a text corpus containing a plurality of natural language sentences tagged with the plurality of predefined classes.

11. The user intent determination system as claimed in claim 7, wherein the plurality of predefined classes comprises a Begin-Central Idea (BCI), a Inside Central Idea (ICI), a Begin-Central Action (BCA), an Inside-Central Action (ICA), Begin-Central Idea Attributes (BCIA) and an Inside-Central Idea Attributes (ICIA).

12. The user intent determination system as claimed in claim 7, wherein the user intent is represented as a central idea, actions and features.

13. A non-transitory computer readable medium including instruction stored thereon that when processed by at least one processor cause a user intent determination system to perform operations comprising:
receiving an input statement provided by a user from a Natural Language Understanding (NLU) engine, wherein the input statement is processed to remove one or more irrelevant content;
extracting a plurality of features for each word in the processed input statement, wherein the plurality of features comprises a Parts of Speech (POS) label, a dependency parse tree and word embeddings;
predicting a class for the each word in the processed input statement from a plurality of predefined classes using a neural network model, wherein the neural network model predicts the class for the each word based on an input vector generated for the each word based on the plurality of features, wherein the input vector comprises the POS label for a target word selected from a plurality of words present in the input statement, the POS label of a predetermined number of words prior to the target word, word embeddings of the target word, a word embedding of a head word in the dependency parse tree and a dependency label for the target word; and
identifying the user intent based on the class predicted for the each word in the processed input statement, wherein the user intent is provided to the NLU engine to provide a response to the input statement based on the user intent.

14. The non-transitory computer readable medium as claimed in claim 13, wherein the dependency parse tree is generated based on intrinsic dependencies of the each word with each of other words in the processed input statement.

15. The non-transitory computer readable medium as claimed in claim 13, wherein the word embeddings are a representation of the word in a first dimensional vector space, the word embeddings are identified using an artificial word embedding neural network trained using a text corpus of a plurality of natural language sentences.

16. The non-transitory computer readable medium as claimed in claim 13, wherein the plurality of predefined classes comprises a Begin-Central Idea (BCI), a Inside Central Idea (ICI), a Begin-Central Action (BCA), a Inside-Central Action (ICA), Begin-Central Idea Attributes (BCIA), and an Inside-Central Idea Attributes (ICIA).

17. The non-transitory computer readable medium as claimed in claim 13, wherein the user intent is represented as a central idea, actions and features.

* * * * *